June 22, 1948. E. H. ALDEBORGH ET AL 2,443,881
BORE GAUGE
Filed Feb. 3, 1947
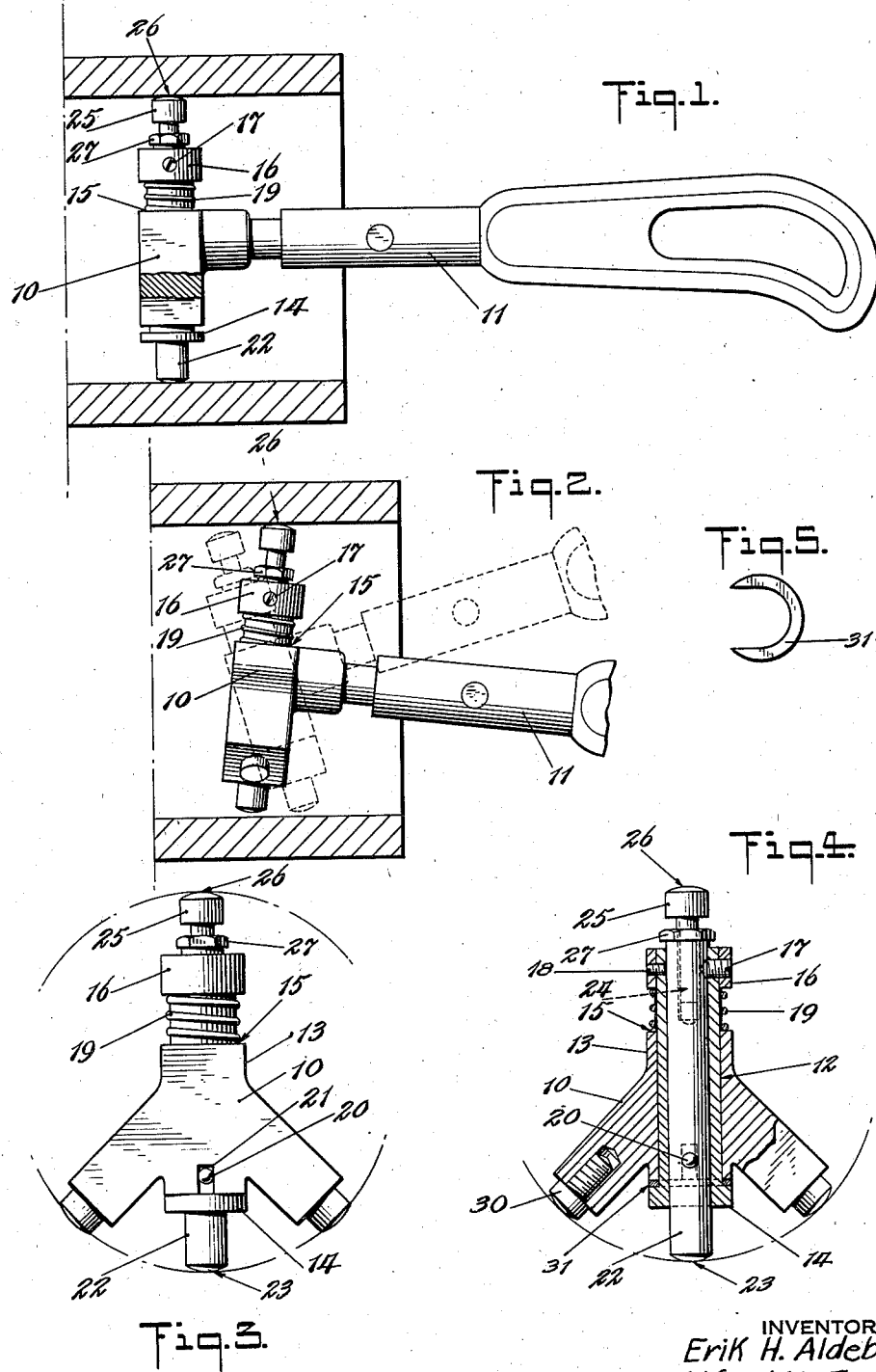
INVENTORS
Erik H. Aldeborgh
Alfred H. Emery
BY Darly & Darly
ATTORNEYS Patented June 22, 1948

2,443,881

UNITED STATES PATENT OFFICE 2,443,881

BORE GAUGE

Erik H. Aldeborgh, Poughkeepsie, and Alfred H. Emery, Wappingers Falls, N. Y., assignors to Standard Gage Company, Inc., Poughkeepsie, N. Y., a corporation of New York Application February 3, 1947, Serial No. 726,170

8 Claims. (Cl. 33—178)

1

The present invention relates to bore gages, and particularly to bore gages of the fixed limit type. The gage of the present invention, however, is arranged so that the limit may be adjusted within a range.

In our copending application, Serial No. 561,651, filed November 3, 1944, there is disclosed a bore gage having fixed and non-adjustable limits, this gage comprising an equatorial zone of a sphere subdivided into portions located at the opposite ends of a diameter of the sphere and each provided with a clearance surface adjacent to and substantially coextensive with the portion. This gage, as indicated above, is not adjustable and, consequently, a new gage must be supplied for each dimension to be gaged.

The present invention follows the general principles of the gage above mentioned, but is differently constructed and is so arranged as to make it possible to adjust the measured dimension. The instant gage, like the gage of the copending application, is capable of measuring only one dimension, and a pair of gages is necessary in order to determine whether or not a particular bore lies within the specified tolerance limits. In other words, one of the pair of gages is the "go" gage and the other is the "not go" gage.

In the gage of the present invention, a body portion is provided which is generally Y-shaped and this body portion is provided on the arms of the Y with centering pins which serve to properly locate the stem of the Y so that a measuring plunger extending therethrough will be located on and will take a measure of the diametrical dimension of the bore.

It is an object of the invention to provide a fixed limit bore gage having a range of adjustment for the above-mentioned fixed limit.

It is another object of the invention to provide a bore gage of the type described in which centering pins are provided to assure that the measure taken will always be on the diametrical line of the bore.

It is another object of the invention to provide a bore gage having spring means on the measuring plunger thereof to assure that the measuring plunger will be out of contact with the walls of the bore as the gage is inserted in the bore to thus make it possible for the centering pins to perform their function.

Other objects and features of the invention will appear when the following description is considered in connection with the annexed drawings, in which—

Fig. 1 is a cross-sectional view of a workpiece

2 having a bore therein showing the gage of our invention in position in the bore; this figure illustrates the position of the gage when the bore diameter is less than the gage dimension;

Fig. 2 is a view similar to Fig. 1 but showing the position which the gage will assume when the bore diameter is greater than the dimension to which the gage is set;

Fig. 3 is an end view of the gage of Figs. 1 and 2, subsequent to adjustment thereof, illustrating the fact that the centering pins normally extend radially beyond the central gaging plunger;

Fig. 4 is a view of the gage of Figs. 1 and 2 illustrating the mode of making adjustment of the gage to achieve the conditions illustrated in Fig. 3; and Fig. 5 is a view of a small shim or washer utilized in making the adjustment illustrated in Figs. 3 and 4.

Referring now to the drawings, the gage of our present invention comprises a Y-shaped body 10 having the usual handle 11 affixed thereto and extending perpendicularly therefrom. This handle is of such a weight, as clearly will later appear, as to make the gaging dependent solely upon the positioning of the gage and not upon the force exerted on the gage by the operator. The body portion 10 is provided with a bore 12 extending centrally thereof, in which bore a sleeve 13 is slidably mounted. The sleeve 13 is provided with a shoulder at 14 to limit its movement in one direction, namely, upwardly, as seen in the drawings, and is urged upwardly by means of a spring 19 which extends between the edge 15 of the body portion 10 and a collar 16 which is mounted on the sleeve 12 and fastened thereto by means of set screw 18. The sleeve 13 is prevented from rotating in the bore by means of a pin 20 in the sleeve cooperating with a slot 21 in the body 10, as is best seen in Fig. 3.

Slidably mounted in the sleeve 13 is the measuring plunger 22 which terminates in the spherical surface 23 at its lower end and which is drilled and tapped at its upper end, as indicated at 24. Mounted in the tapped hole 24 is a measuring button 25 which is provided with a spherical surface 26. This measuring button may be adjusted by screwing it into or out of the tapped hole 24 and may be located in its adjusted position by means of the usual lock nut 27.

Each arm of the Y is provided with a bore 28 in which a centering pin 30 is inserted, these centering pins being adjustable in any suitable manner, as, for example, by making them a drive fit in the bore 28 or by tapping the bore 28 and mounting the centering pins or buttons 30 in the same manner as the measuring button 25 is mounted.

The gage of this invention is utilized by first tipping the handle above the horizontal position to the dotted-line position illustrated in Fig. 2 and inserting the gage in the bore. If the handle then stops in the horizontal position, as shown in Fig. 1, or above it, it indicates that the bore is smaller than the set dimension; while if the gage and handle take the position shown in full lines in Fig. 2, it shows that the bore is greater than the gaging dimension.

In order for the centering pins 30 to function to center the gage in the bore, it is necessary that these pins normally extend radially outwardly further than does the measuring plunger 22. To accomplish this, the gage is inserted in a master ring having an internal bore of the same dimension as that to which the measuring plunger and measuring button are set.

With the gage thus inserted, screw 17, which is threaded through sleeve 13 and bears against plunger 22, is loosened and sleeve 13 moved downwardly until a spacing shim or washer 31 (see Figs. 4 and 5) can be inserted between the lower edge of the central portion of the body 10 and the shoulder 14 of sleeve 13. With the washer in this position, the set screw 17 is again tightened against the plunger 22 and the washer 31 removed. Spring 19, acting against the collar 16, then causes the sleeve 13 and plunger 22 to move upwardly into the position illustrated in Fig. 3, in which, as is clearly seen in Fig. 3, the centering pins 30 extend radially outwardly slightly further than does the measuring plunger 22. Consequently, when the gage is inserted in a bore to be measured, as illustrated in Fig. 1, the centering plungers will make contact with the lower walls of the bore and assure the positioning of the measuring plunger 22 along a diameter of the bore. As a result, when the gage is tipped into the position of Fig. 1, the measuring plunger will measure a diameter of the bore, and if the bore is of a lesser diametrical extent than the setting of the plunger 22 and its cooperating measuring button 25, the gage will be stopped in its rotation with the handle in the position illustrated in Fig. 1. As was indicated above, the weight of the handle is so coordinated with the weight of the gage parts that rotation of the gage is effected by the weight of the handle only and it is neither necessary nor desirable that the operator apply any pressure to the handle which would or might cause marring of the surface of the bore under measurement.

Spring 19 exerting upward pressure upon the plunger 22 at all times causes the upper measuring button 26 to come into contact with the upper surface of the bore and thereafter, as the measuring button 25 slides along the interior of the bore, the measuring plunger 22 is depressed and comes into contact with the diametrically opposite point on the lower surface of the bore. If the bore is above size, the plunger 22 never comes into contact with the lower surface of the bore and the handle will drop to a position below the horizontal, as is illustrated in full lines in Fig. 2.

Due to the fact that spring tension is exerted by the spring 19, a certain hesitation is felt as the handle passes through the horizontal position, and the adjustment of the position of the sleeve 13 and plunger 22 thus not only provides for a proper adjustment of the centering or locating pins 30, but also contributes to provide the "feel" to the gage which is important in use since gage operators are generally accustomed to gaging their dimensions in accordance with their experience in handling gages and thus in accordance with the "feel" which is imparted to their sense of touch by the gage during its gaging movement.

While we have described a preferred form of our invention, it will be understood that the basic principles may be utilized in various modifications. Consequently, we do not wish to be limited by the foregoing description, which was given solely for the purpose of limitation, but, on the contrary, wish to be limited only by the following claims.

What is claimed is:

1. In a bore gage of the fixed limit type, in combination, a measuring plunger having a length substantially equal to the diameter of the bore to be gaged, a body member in which said plunger is mounted, a handle on said body member extending at right angles to said plunger, centering means mounted in said body member one on either side of said plunger and in the plane thereof, said centering means extending substantially radially of the bore, and spring means normally urging said plunger in a direction to cause the end thereof which lies between said centering means to normally extend radially a lesser amount than do said centering means.

2. In a bore gage of the fixed limit type, in combination, a measuring plunger having a length substantially equal to the diameter of the bore to be gaged, means for adjusting the length of said measuring plunger for different bores within a range, a body member in which said plunger is mounted, a handle on said body member extending at right angles to said plunger, centering means mounted in said body member one on either side of said plunger and in the plane thereof, said centering means extending substantially radially of the bore, means for adjusting the length of said centering means in accordance with the bore to be gaged, and spring means normally urging said plunger in a direction to cause the end thereof which lies between said centering means to normally extend radially a lesser amount than do said centering means.

3. In a bore gage of the fixed limit type, in combination, a measuring plunger having a length substantially equal to the diameter of the bore to be gaged, a body member in which said plunger is mounted, a handle on said body member extending at right angles to said plunger, centering means mounted in said body member one on either side of said plunger and in the plane thereof, said centering means extending substantially radially of the bore, spring means normally urging said plunger in a direction to cause the end thereof which lies between said centering means to normally extend radially a lesser amount than do said centering means, and means to adjust the plunger position to determine the difference between the extension of said plunger and said centering means.

4. In a bore gage of the fixed limit type, in combination, a measuring plunger having a length substantially equal to the diameter of the bore to be gaged, means for adjusting the length of said measuring plunger for different bores within a range, a body member in which said plunger is mounted, a handle on said body member extending at right angles to said plunger, centering means mounted in said body member one on either side of said plunger and in the plane thereof, said centering means extending substantially radially of the bore, means for adjusting the length of said centering means in accordance with the bore to be gaged, spring means normally urging said plunger in a direction to cause the end thereof which lies between said centering means to normally extend radially a lesser amount than do said centering means, and means to adjust the plunger position to determine the difference between the extension of said plunger and said centering means.

5. In a bore gage of the fixed limit type, in combination, a body member, a handle affixed thereto, measuring means extending outwardly from said body member, centering means extending outwardly from said body member in the plane of said measuring means, said centering means being circumferentially spaced one on either side of one end of said measuring means, spring means urging said measuring means in a direction to cause said one end of said measuring means to extend radially to a lesser extent than said centering means, and adjustable means to limit the movement of said measuring means under the urge of said spring.

6. In a bore gage of the fixed limit type, in combination, a generally Y-shaped body member, a handle affixed thereto and extending perpendicularly to the plane of the Y, measuring means extending through the stem of said Y, centering means extending radially outward and mounted in the arms of said Y, spring means urging said measuring means in a direction to cause said one end of said measuring means to extend radially to a lesser extent than said centering means, and adjustable means to limit the movement of said measuring means under the urge of said spring.

7. In a bore gage of the fixed limit type, in combination, a body member, a handle affixed thereto, a sleeve slidably mounted in said body member for movement at right angles to said handle, measuring means extending through said sleeve and radially outwardly from said body member, centering means extending outwardly from said body member in the plane of said measuring means, said centering means being circumferentially spaced one on either side of one end of said measuring means, a collar mounted on said sleeve external of said body member, spring means extending between said body member and said collar, means to fix the position of said collar on said sleeve, a shoulder on said sleeve to limit the movement thereof in one direction, and means to fix the position of said measuring means with respect to said sleeve to cause said measuring means to normally extend radially to a lesser extent than said centering means.

8. The method of adjusting a bore gage having a measuring plunger of a length equal to the bore to be gaged and a pair of centering pins one on either side of one end of said plunger and circumferentially spaced from said plunger and having means for limiting the movement of the measuring plunger and spring means for urging the measuring plunger in a direction so that said one end is normally extended radially a lesser extent than said centering pins, said method comprising inserting said gage in a master ring gage, adjusting it to measuring position with both ends of said measuring plunger and said centering pins in contact with the bore of the ring gage, inserting a washer between a fixed point on the gage and said limiting means, adjusting said spring means to maintain said limiting means in contact with said washer, and thereafter removing said washer to permit said measuring plunger to move to a position with the limiting means in contact with a fixed point on the gage, whereby said measuring plunger extends radially a lesser extent than said centering pins and a predetermined spring tension is exerted upon said measuring plunger to maintain it in said position.

ERIK H. ALDEBORGH.
ALFRED H. EMERY.